May 25, 1971  E. E. HEINZELMAN  3,579,732

DRY LUBRICANT COATING OF EXTRUDED TUBING

Filed Jan. 23, 1969

INVENTOR
EARL E. HEINZELMAN

ATTORNEY 3,579,732
DRY LUBRICANT COATING OF
EXTRUDED TUBING
Earl E. Heinzelman, Lancaster, Pa., assignor to Armstrong
Cork Company, Lancaster, Pa.
Filed Jan. 23, 1969, Ser. No. 793,488
Int. Cl. B05b 13/06; B29d 23/04
U.S. Cl. 18—14                                    2 Claims

ABSTRACT OF THE DISCLOSURE

A dry lubricant is applied to the interior surface of an extruded tubing to assist in the placement of the tubing on piping. As the tubing is emerging from the extruder, mica powder is sprayed on the inside of the tubing. The mica powder is placed on the inside of the tubing by a rotating and reciprocating drive which reciprocates to force the powder into the interior of the tube and rotates to keep the mica powder in a nonpacked state. Air may also be supplied to the interior of the tubing to eliminate any vacuum which may be formed during the extrusion of the tube.

BACKGROUND OF THE INVENTION

Field of the invention

The invention relates to an apparatus for lubricating the interior surface of an extruded tube as it leaves the extruder.

Description of the prior art

In apparatus for extruding from rubber or plastic continuous lengths of tubular or closed cross-sectional materials such as hoses, innertubes, sealing gaskets, etc., it is usually necessary to insert a lubricant of some type into the interior of the extrusion to coat the surface so as to prevent the sticking together of the walls if they collapse. Also, with a tubing which is meant to be slid over piping, it is desirable to have a lubricant on the internal surface of the tubing to assist the sliding of the tubing over the piping. Also during the extruding, a void is formed in the center of the tubing; and unless this void is filled with the air, the external atmospheric pressure will tend to collapse the tubing and possibly cause sticking of the sidewalls to form a permanent bond therebetween and, therefore, a flattened tube.

Soapstone, mica dust, zinc stearate and other dry dust lubricants have been used extensively in the prior art to eliminate the above problems. Also, many different apparatuses are available for applying the dry powders to the interior of the tubing. When mica dust is used, it is very important that the dust be kept as a powder because of the tendency of mica to pack itself into lump-type structures. The spraying of the mica powder on the interior walls will provide a good coating to the interior walls of the tubing. The pushing of lumps of mica into the interior of a piece of tubing will not provide a good coating to these interior walls; and, therefore, collapsed sidewall structures could tend to stick together and maintain the tube in a collapsed state. Also, good lubrication is only secured when a mica powder completely coats the interior wall of the tubing Therefore, the object of the apparatus herein is to provide a mica dusting apparatus which provides a complete uniform coating to the interior wall of the tubing.

SUMMARY OF THE INVENTION

The invention herein is directed to a mica dispensing apparatus for applying mica dust to the interior walls of an extruded tubing. A reciprocating drive structure forces the mica dust out through the core pin of the extruder so that the mica dust is sprayed onto the interior walls of the newly extruded tubing. The tendency of the mica dust to pack itself into lumps is eliminated by causing the reciprocating feeder to also rotate. The reciprocating feeder has a fanlike blade structure thereon which during rotation, constantly stirs the mica dust to keep it in a fine powder state. The core of this reciprocating, rotating feeder is hollow so that air may be provided to the core of the tubing should it be found that atmospheric pressure tends to cause the tubes to collapse.

Description of the preferred embodiment

Figure 1:
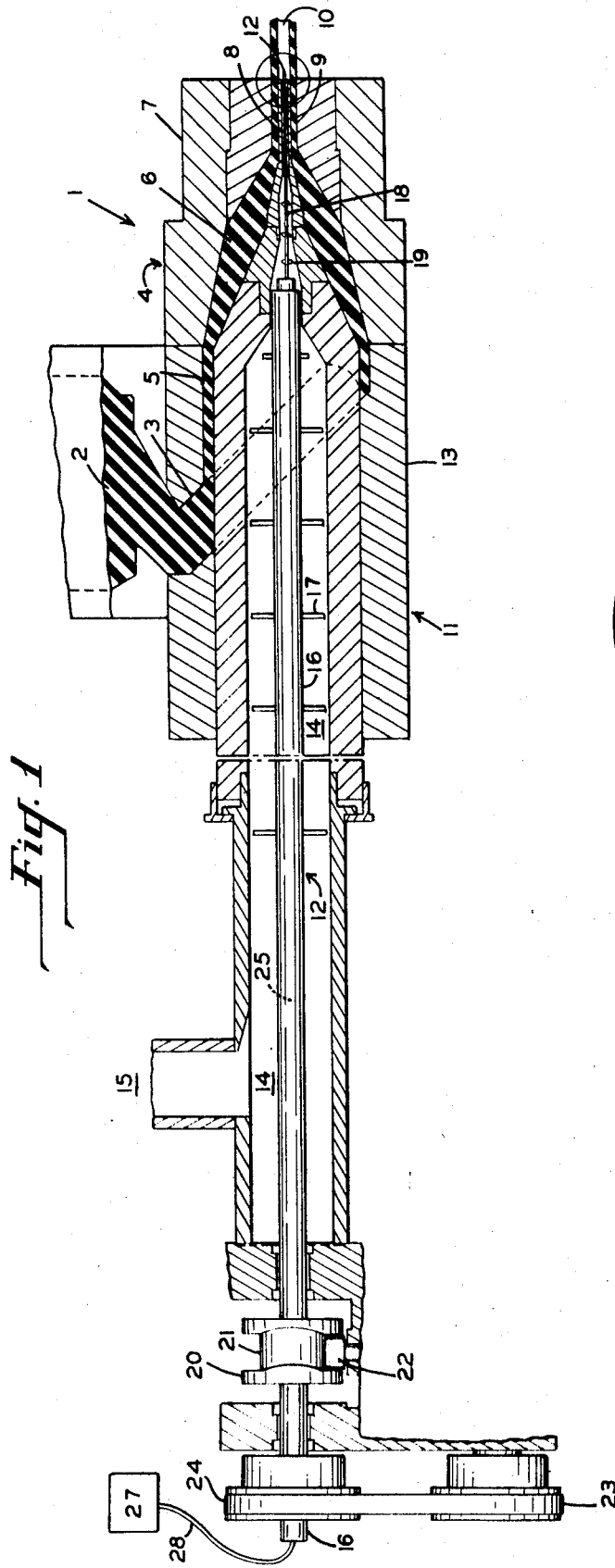
FIG. 1 is a plan view of the invention.
Figure 2:
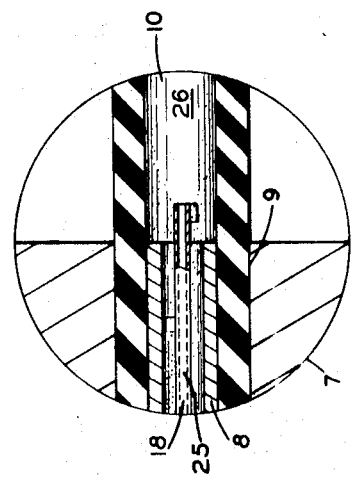
FIG. 2 is an enlargement of part of FIG. 1.

The extruder 1 is a typical crosshead extruder which feeds the material 2 from the main extruder body to a passageway 3, which is located on the side of the extruder head 4. The extrudate 2 moves down a passageway 5 to a chamber 6 in the extruding die 7. A core pin 8 is mounted in the center of the opening 9 of the extruding die. The extrudate passes around the core pin 8 which forms the internal diameter of the extruded tubing while the outer dimension of the opening 9 forms the outer dimension of the extruded tubing.

It is desirable that the internal diameter of the tubing 10 be coated with a substance which would prevent the internal walls from sticking together if the tubing would be squeezed together. Also it is desirable that the internal walls of the tubing be provided with a lubricant so that the tubing may be slid easily over a pipe structure. Mica powder is an excellent lubricant and anti-stick agent for use on the internal walls of the tubing. For the mica powder to be of any value to prevent sticking, it must be applied to the internal walls of the tubing as soon as it leaves the extruding die. The placing of the mica powder on the internal walls of the tubing is accomplished by the use of the dispensing mechanism 11, which has a mica feed structure 12 passing through the hollow core pin 8.

The feed structure 12 is in a housing 13 with an internal chamber 14 which is used as the passageway of the mica powder from a reservoir 15 to the internal surface of the extruded tubing. The mica powder drops by gravity from the reservoir 15 into chamber 14 where the feed structure 12 forces the mica powder through the passageway 14 and out through the hollow core pin to the interior surface of the extruded tubing. The feed structure 12 is mounted for a reciprocating motion to assist in the passage of the mica powder from the reservoir 14 towards the tubing 10. Feed structure 12 is composed of a main body rod 16 with veins 17, which operate to force the mica powder through the passageway 14. Connected to the end of the rod 16 and passing through the hollow core pin is a second feed rod 18 which has small blades 19 serving the same function as blades 17. Feed rod 18 extends completely through the core pin and slightly beyond the end of the core pin so that it will distribute the mica powder to the internal wall of the extruded tube.

As was indicated above, the feed rods 16 and 18 reciprocate back and forth to push the mica powder forward and at the same time rotate to stir the mica powder to prevent it from lumping. This combined movement of the feed elements is accomplished by the use of a cam assembly 20 with a cam groove 21 moving in coaction with a fixed cam follower 22. It will be seen from the drawing that the pathway of the cam groove 21, moving relative to the fixed follower 22, will cause a reciprocating action of the feed structure. The rotational movement of the cam and of the feed structure is accomplished by a conventional variable speed drive 23, which is hooked by appropriate means to a pulley 24 on the extreme end of the feed rod 16.

It should be noted that the feed rod 16 has a passageway 25 therethrough to provide this element with a hollow core. This passageway extends on into a hollow core of the feed rod 18, and the passageway opens at the end of the feed means 18 within the void 26 of the extruded tube. If it is found that the void 26 tends to be extremely low in pressure, the atmospheric pressure on the outside of the tube will tend to collapse the tube. To prevent a vacuum from forming in the void 26, an air supply 27 is hooked by appropriate means 28 to the end of the feed assembly 12 to feed air into the passageway 25. This air then feeds down into the void 26 to provide a pressure therein to counteract atmospheric pressure. Also, air could be added to the powder and inserted with it into the void 26 as a substitute for or in conjunction with the air passageway 25.

What I claim is:

1. In an extruder structure for forming hollow tubular devices, a core pin used to form the internal diameter of the tube while a core die forms the external diameter of the tube, the core pin being placed within an opening in the core die, means feeding extrudate to the core die and forcing the extrudate through the core die and around the core pin to form the hollow tubular device, the improvement comprising, a passageway in the center of the core pin, means with a reciprocating and rotational motion forcing a dry powder lubricant through the core pin passageway to place the dry lubricating powder on the internal walls of the extruded tube.

2. The apparatus of claim 1 wherein the reciprocating and rotating structure has a plurality of blades mounted thereon so that the rotational movement of the blades will tend to stir the dry lubricant and keep it as a powder while the reciprocating movement of the blades pushes the dry powder toward the tubing to be coated.

References Cited
UNITED STATES PATENTS

| | | | |
|---|---|---|---|
| 819,862 | 5/1906 | Cutler | 241—205X |
| 1,768,671 | 7/1930 | Devine | 18—14 |
| 2,597,553 | 5/1952 | Weber | 18—14X |
| 3,011,213 | 12/1961 | Brandon, Jr. et al. | |
| 3,165,785 | 1/1965 | Hehl. | |
| 3,335,457 | 8/1967 | Martin, Jr. | 18—30X |
| 3,339,896 | 9/1967 | McKibben | 241—175X |

J. SPENCER OVERHOLSER, Primary Examiner

R. L. SPICER, JR., Assistant Examiner

U.S. Cl. X.R.

118—317